US011993958B2

(12) United States Patent
Müller et al.

(10) Patent No.: US 11,993,958 B2
(45) Date of Patent: May 28, 2024

(54) BOTTLE LOCK

(71) Applicant: rapitag GmbH, Munich (DE)

(72) Inventors: Sebastian Müller, Munich (DE); Alexander Schneider, Munich (DE)

(73) Assignee: rapitag GmbH, Munich (DE)

( * ) Notice: Subject to any disclaimer, the term of this patent is extended or adjusted under 35 U.S.C. 154(b) by 337 days.

(21) Appl. No.: 17/461,065

(22) Filed: Aug. 30, 2021

(65) Prior Publication Data

US 2022/0074237 A1 Mar. 10, 2022

(30) Foreign Application Priority Data

Sep. 8, 2020 (DE) ..................... 10 2020 211 267.3

(51) Int. Cl.
*E05B 73/00* (2006.01)
*B65D 55/14* (2006.01)

(52) U.S. Cl.
CPC .......... *E05B 73/0041* (2013.01); *B65D 55/14* (2013.01)

(58) Field of Classification Search
CPC .. E05B 73/00; E05B 73/0017; E05B 73/0041; B65D 55/00; B65D 55/14; B65D 55/145
USPC .............................................................. 70/57
See application file for complete search history.

(56) References Cited

U.S. PATENT DOCUMENTS 7,007,523 B2 3/2006 Belden, Jr.
10,180,018 B1 * 1/2019 Simpson ............... A61J 7/0481
2013/0062303 A1 * 3/2013 Serell ........................ A61J 1/03 215/206
2015/0353246 A1 * 12/2015 Coupland ............ B65D 47/243 215/208
2016/0004951 A1 1/2016 Norman et al.
2016/0321894 A1 * 11/2016 Schneider ............ G08B 13/242

FOREIGN PATENT DOCUMENTS

DE 69403641 T2 9/1997
DE 602004012623 T2 5/2009
DE 102015003042 A1 9/2016
EP 2777031 A1 9/2014
EP 2777031 B1 3/2017
WO WO-02056820 A1 * 7/2002 ........... B65D 51/002
WO 2017202986 A1 11/2017

OTHER PUBLICATIONS

German Application No. 10 2020 211 267.3, German Search Report dated Apr. 19, 2021, 7 pages.

* cited by examiner

*Primary Examiner* — Nathan Cumar
(74) *Attorney, Agent, or Firm* — Kilpatrick Townsend & Stockton LLP

(57) ABSTRACT

The invention relates to a bottle lock for a bottle, comprising a housing part designed to enclose an upper portion of the bottle neck of the bottle to be secured, including the bottle cap of the bottle to be secured, a plurality of claws arranged in the housing part, which are designed and intended to engage non-releasably with the upper portion of the bottle neck when the bottle lock is in a secured state and to allow the bottle lock to be released and removed away from the upper portion of the bottle neck in the released state of the bottle lock, and to a locking mechanism intended to assume an unlocked state in which the bottle lock can be transferred from the secured state to the released state, and a locked state in which the bottle lock cannot be transferred from the secured state to the released state.

20 Claims, 8 Drawing Sheets

BOTTLE LOCK

CROSS-REFERENCE TO RELATED APPLICATION

This application claims priority to German Patent Application No. 10 2020 211 267.3, filed in Germany on Sep. 8, 2020, the entire contents of which are hereby incorporated herein by this reference.

DESCRIPTION

The invention relates to a bottle lock for a bottle, comprising a housing part which is designed to enclose an upper portion of the bottle neck of the bottle to be secured, including the bottle cap of the bottle lock, a plurality of claws arranged in the housing part, which are designed and intended to engage non-releasably with the upper portion of the bottle neck when the bottle lock is in a secured state and to allow the bottle lock to be released and removed away from the upper portion of the bottle neck in a released state of the bottle lock, and a locking mechanism which is designed and intended to assume an unlocked state in which the bottle lock can be transferred from the secured state to the released state, and to assume a locked state in which the bottle lock cannot be transferred from the secured state to the released state.

Locking devices of the generic type are often also known under the designation “bottle caps” or “bottle locks” and are used, for example, to secure wine bottles or the like in publicly accessible sales areas. Due to the fact that such locking devices can be attached to a bottle cap, they have the advantage of being able to prevent, in addition to theft per se, i.e. the unauthorised removal of the goods to be secured together with the bottle lock from a publicly accessible sales area of a shop, also the unauthorised opening of the bottle within this sales area.

For this purpose, such generic locking devices have, on the one hand, an anti-theft element, for example an RFID chip or an EAS element (electronic article surveillance), which is set up to interact with an external anti-theft system, for example a transmitter/receiver unit for electromagnetic radiation of a suitable wavelength, so that when the bottle lock equipped with the RFID chip or the EAS element is passed by, a signal is generated and an alarm can be triggered.

On the other hand, an unauthorised removal of the bottle lock from the bottle to be secured must be prevented, which is why a locking mechanism is generally also provided on generic locking devices, which is designed and intended, in a locked state, i.e. a secured state of the locking mechanism, to substantially ensure non-releasable engagement between the bottle lock and the bottle to be secured.

Due to the fact that the bottles to be secured and their caps can have greatly varying dimensions, a large number of different bottle locks often have to be kept ready to secure an entire range of bottles. In addition to high costs, this also leads to disadvantageous handling, since the appropriate bottle lock must first be determined for each bottle.

It has also been shown in the past that bottle locks attached to secured bottles can often be removed by force from the bottle to be secured without permission and unnoticed, since the locking mechanism is often only designed for comparatively low actuation forces.

It is therefore the object of the present invention to provide a remedy here.

According to a first aspect of the present invention, the object is achieved by a bottle lock of the type mentioned at the outset, in which the plurality of claws is subdivided into at least a first and a second claw arrangement, wherein each claw arrangement is assigned a part of the plurality of claws, wherein the first claw arrangement differs from the second claw arrangement with regard to at least one claw design feature.

The difference can only be in the form of a respective claw design feature. In addition, it is also conceivable, for example, that the first claw arrangement comprises a claw design feature that does not include the second claw arrangement, which can be, for example, a projection and/or a depression and/or the like. As a result, a large number of different bottle types can be secured with a single bottle lock, which bottle types differ, for example, with regard to diameter and/or bottle neck length and/or bottle neck shape and/or cap.

The difference can only be in the form of a particular design feature. In addition, it is also conceivable, for example, that the first claw arrangement comprises a design feature which the second claw arrangement does not include, wherein it is possible for example for this to be a projection and/or a depression and/or the like. As a result, a large number of different bottle types can be secured with a single bottle lock, which bottle types differ, for example, with regard to diameter and/or bottle neck length and/or bottle neck shape and/or cap.

The claws can act in particular according to the principle of a barb and, for example, interact with a bead on the bottle neck in the secured state of the bottle lock in such a way that the bottle lock is prevented from being pulled off the bottle neck.

According to one development, the at least one design feature can correspond to a length and/or a width and/or an angle and/or a shape of the claws.

In addition, in order to be able to provide a large number of possible attachment positions of the bottle lock on the bottle to be secured as well as a particularly high level of security against unauthorised removal, it can additionally or alternatively be provided that the first claw arrangement and/or the second claw arrangement each consist of a plurality, preferably along a direction of attachment of the bottle lock, of claws arranged in a row.

In order to be able to ensure an adequate distribution of force in the circumferential direction of the housing, the first claw arrangement and the second claw arrangement can be arranged adjacent to one another, preferably in an alternating manner, along a circumferential direction of the housing part.

In principle, the claws themselves can be deformable, which ensures adaptation to varying types of bottles. According to a further embodiment, however, at least some of the plurality of claws can be attached in a displaceable or pivotable manner to the housing or a part connected thereto and can be biased in the direction of the bottle neck by a resilient element, for example a spring, in particular a spiral spring. In addition to an improved contact between the claws and the bottle to be secured, this also results in a further increased adaptability of the bottle lock.

In order to be able to ensure particularly good assembly of the bottle lock on the bottle to be secured, according to a further embodiment, the housing can comprise at least a first housing part and a second housing part, which are connected to one another so as to be movable relative to one another and can be transferred between the secured state, in which the plurality of claws of the bottle lock engages non-releasably with the upper portion of the bottle neck, and the released state, in which a detachment of the bottle lock from the bottle neck is made possible.

In order to be able to securely and non-detachably connect the two housing parts to one another in the secured state, the locking mechanism can be assigned to one of the first and the second housing part and can be set up to lock the first and the second housing part in the secured state.

In principle, the first and the second housing part can be present as two separate components in the released state of the bottle lock. In order to allow improved manageability of the bottle lock at this point, in particular in the open, i.e. in the released state of the bottle lock, it is proposed that the first and the second housing part are connected to one another by a hinge in a pivotable manner relative to one another, wherein preferably a pivot axis of the hinge is arranged in the secured state above the bottle neck or parallel thereto.

In order to allow particularly convenient opening of the bottle lock in this context, as soon as the locking mechanism has released a movement of the two housing parts relative to one another, it is further proposed that the first and the second housing part are preloaded to their released state by a second resilient element, for example a spring, in particular a spiral spring.

In order to be able to keep the two housing parts also securely in the secured state, it can be provided according to a further embodiment that the locking mechanism comprises an actuating element which can be displaced between a released position and a secured position, a blocking element which is operatively connected to the actuating element and which in the secured position of the actuating element engages with the other of the first and the second housing part in order to fix the two housing parts in their relative orientation, and a release element which is assigned to the actuating element and is set up to block a movement of the actuating element from the secured position into the released position in the locked state of the locking mechanism, and to allow a movement of the actuating element from the secured position into the released position in the unlocked state of the locking mechanism.

According to a second aspect of the present invention, which can preferably be combined with the first aspect, the object is achieved by a bottle lock of the type mentioned at the outset, which comprises an insert portion which is designed and intended to be inserted into the housing part of the bottle lock, wherein the plurality of claws is attached to or encompassed by the insert portion.

Due to the fact that the claws are attached to the insert portion or encompassed thereby, the producibility of the bottle lock can be improved, since a large number of different variants of bottle locks can be produced for a large number of different bottle types, wherein only a separate insert portion has to be produced in each case, but otherwise an identical housing and an identical locking mechanism can be used.

In a development, it is also proposed that the insert portion is also designed and intended to be releasably inserted into the housing part. As a result of this, the insert portion can be designed to be exchangeable for reasons related to the purpose or wear, which not only increases the ease of maintenance of the bottle lock according to the invention.

According to a further aspect, the invention also relates to a kit comprising at least one bottle lock according to the invention in accordance with the second aspect having at least two of the above-described insert portions.

According to a third aspect of the present invention, which can preferably be combined with the first and/or the second aspect, the object is achieved by a bottle lock for a bottle, comprising a first and a second housing part, which are designed to non-releasably enclose an upper portion of the bottle neck of the bottle to be secured, including the bottle cap, in a secured state, wherein the first and the second housing part are connected to one another such that they can move relative to one another and can be transferred between the secured state and a released state in which the bottle lock can be released from the bottle neck, and a locking mechanism which is assigned to one of the first and the second housing part and is set up to lock the first and the second housing part in the secured state, wherein the locking mechanism comprises an actuating element which can be displaced between a released position and a secured position, a blocking element which is operatively connected to the actuating element and which, in the secured position of the actuating element, engages with the other of the first and the second housing part in order to fix the two housing parts in their relative alignment, and a release element which is assigned to the actuating element and is set up to block a movement of the actuating element from the secured position into the released position in the locked state of the locking mechanism and to allow a movement of the actuating element from the secured position into the released position in the unlocked state of the locking mechanism, wherein the blocking element is arranged substantially transversely to the actuating element.

In particular, the blocking element can be oriented at an angle of 70° to 110°, preferably at an angle of approximately 90°, relative to the actuating element and/or a direction of movement of the actuating element.

The configuration according to the invention of the locking mechanism has the result that the force holding the two housing parts in the secured state is not provided by the actuating element itself, but rather by the blocking element. In this case, the blocking element is preferably also arranged such that it is stressed in the tension-compression direction. As a result, the resistance of the locking mechanism compared to known locking mechanisms can be increased significantly.

According to one embodiment, the blocking element can be designed as an elongated strip made of sheet metal, which is preferably at least partially sheathed with plastics material, and/or is substantially completely made of plastics material. In this way, sufficient resistance can be ensured together with sufficient deformability of the blocking element.

In order to be able to adequately transfer the force exerted by the blocking element to the second housing part, it is further proposed that the other of the first and the second housing part comprises a recess which is designed and intended to interact with the blocking element.

According to one embodiment, it can be provided that the actuating element is movably connected to the blocking element, wherein one end of the actuating element is preferably designed as a pin and/or is nail-shaped and/or the blocking element is fork-shaped. As a result, a reliable movement coupling between the actuating element and the blocking element can be realised which, however, at the same time ensures the required kinematic degrees of freedom.

In addition or as an alternative to this, the release element can be designed as a slide which has an opening through which the actuating element is guided, and/or the release element can be displaced substantially orthogonally to a direction of movement of the actuating element in order to selectively block or release the movement of the actuating element. In the locked state of the locking mechanism, the release element can engage with the actuating element, preferably in a form-fitting manner, in such a way that a movement of the actuating element from the secured position into the released position is prevented, and in the unlocked state of the locking mechanism it can be disengaged from the actuating element such that a movement of the actuating element from the secured position into the released position is allowed.

In the event that the bottle lock is in the released state, i.e. an opened state, but the locking mechanism has already assumed its locked state, it may be that the bottle lock cannot be transferred to the locked state, i.e. a closed state, without it first being necessary to transfer the locking mechanism into the unlocked state. In order to ensure improved, in particular more time-efficient, handling of the bottle lock at this point, it is proposed according to a further embodiment that the release element has a projection which is designed and intended to interact with a further projection formed on the other of the first and the second housing part when the bottle lock is transferred to the secured state in such a way that the release element releases the movement of the actuating element in the direction of its released position.

In addition, in order to allow a substantially automated opening movement of the actuating element from the secured position into the released position as soon as the release element has released the movement of the actuating element, the actuating element can be preloaded to its released position by a third resilient element, for example a spring, in particular a spiral spring.

In principle, the release element can be actuated mechanically and/or magnetically. However, if the actuation can also be carried out remotely, for example, it is advantageous that the locking mechanism further comprises an actuator which is operatively coupled to the release element, wherein the actuator is preferably at least partially formed by a shape memory alloy and/or a piezoelectric element.

According to a fourth aspect of the present invention, which can preferably be combined with at least one of the first to third aspects, the object is achieved by a bottle lock for a bottle, comprising a housing part which is designed to enclose an upper portion of the bottle neck of the bottle to be secured, including the bottle cap of the bottle lock, a plurality of claws arranged in the housing part, which are designed and intended to engage non-releasably with the upper portion of the bottle neck when the bottle lock is in a secured state, and to allow the bottle lock to be released and removed away from the upper portion of the bottle neck in the released state of the bottle lock, and a locking mechanism which is designed and intended to transfer the bottle lock from the secured state into the released state and from the released state into the secured state, wherein the bottle lock further comprises a first sensor unit, which is set up to detect whether the bottle lock is in the secured state or in the released state, and a second sensor unit, which is set up to detect whether the upper portion of the bottle neck of the bottle to be secured is enclosed or not.

As a result, it is possible to detect not only whether the bottle lock is in the secured state or in the released state, but also whether the upper portion of the bottle neck of the bottle to be secured is enclosed or not, i.e. whether the bottle lock is located on the bottle to be secured or not. As a consequence of this, in order to save energy, the bottle lock can, for example, be put into an idle mode if the bottle lock is in the released state, preferably for longer than a predetermined time period. If the bottle lock is then closed again, i.e. transferred to the released state, the bottle lock, on the other hand, can be switched back to an active mode. Since the second sensor unit can also detect whether the bottle lock is located on the upper portion of the bottle neck of the bottle to be secured, the bottle lock can be put into an alarm mode, preferably automatically, as soon as it is attached to the bottle. Also, if the bottle lock is removed from the bottle in the alarm mode without having previously been unlocked, for example by receiving a release signal or the like, a corresponding acoustic or visual alarm signal can be emitted.

The first sensor unit and/or the second sensor unit can preferably comprise a light barrier and/or an ultrasonic sensor and/or a magnetic sensor and/or a pushbutton switch and/or a Hall sensor.

According to a fifth aspect, which can be combined with the fourth aspect, the above object is also achieved by a method for operating a bottle lock, in particular according to the fourth aspect, comprising the following steps:

a) putting the bottle lock into an idle mode;
b) detecting whether the bottle lock is transferred from a released state to a secured state;
c) as soon as the bottle lock has been transferred from the released state to the secured state, switching the bottle lock into an active mode;
d) detecting whether the bottle lock is attached to an upper portion of a bottle neck of a bottle to be secured;
e) as soon as the bottle lock has been attached to the upper portion of the bottle neck of the bottle to be secured, switching the bottle lock into an alarm mode;
f) monitoring whether the bottle lock is removed from the upper portion of the bottle to be secured, and if this is the case, emitting an alarm signal; and
g) receiving an opening signal and transferring the bottle lock from the secured state to the released state, so that the bottle lock can be removed from the upper portion of the bottle neck of the bottle to be secured and returning to step a).

With regard to the advantages and effects of the method according to the invention, reference is made to the above statements with regard to the bottle lock according to the invention, which also apply in an analogous manner to the method according to the invention.

The invention will be explained in more detail below on the basis of an embodiment using the accompanying drawings. In the drawings.

Figure 6C:
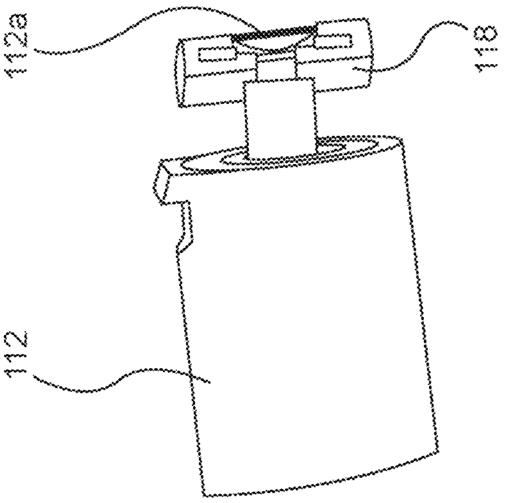
Figure 6B:
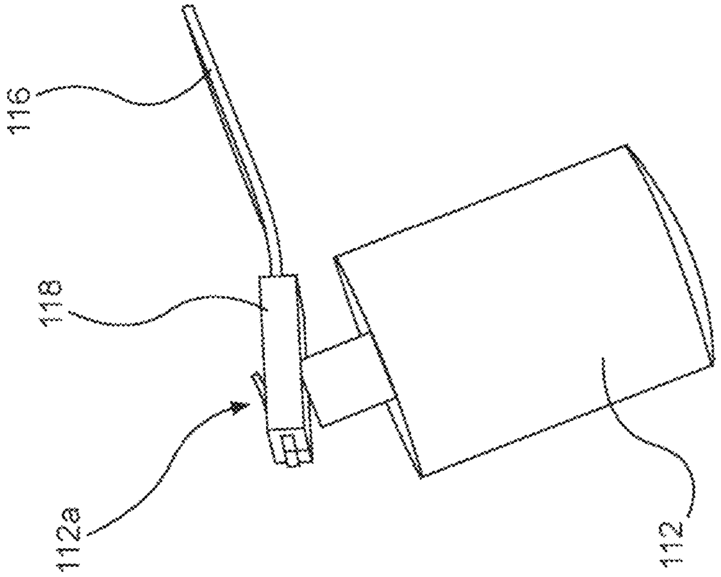
Figure 6A:
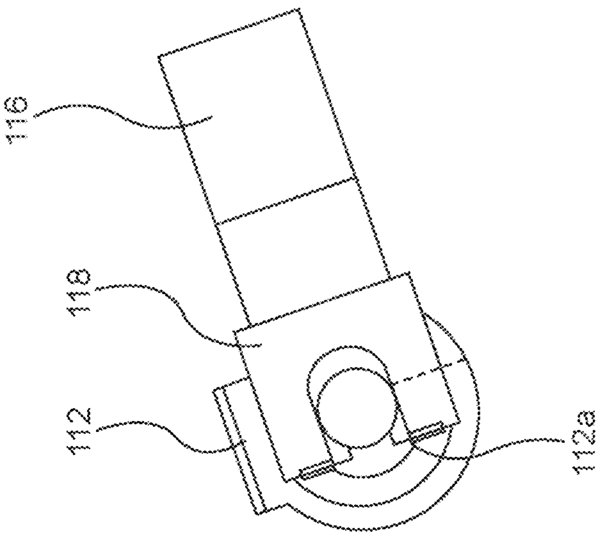
Figure 7:
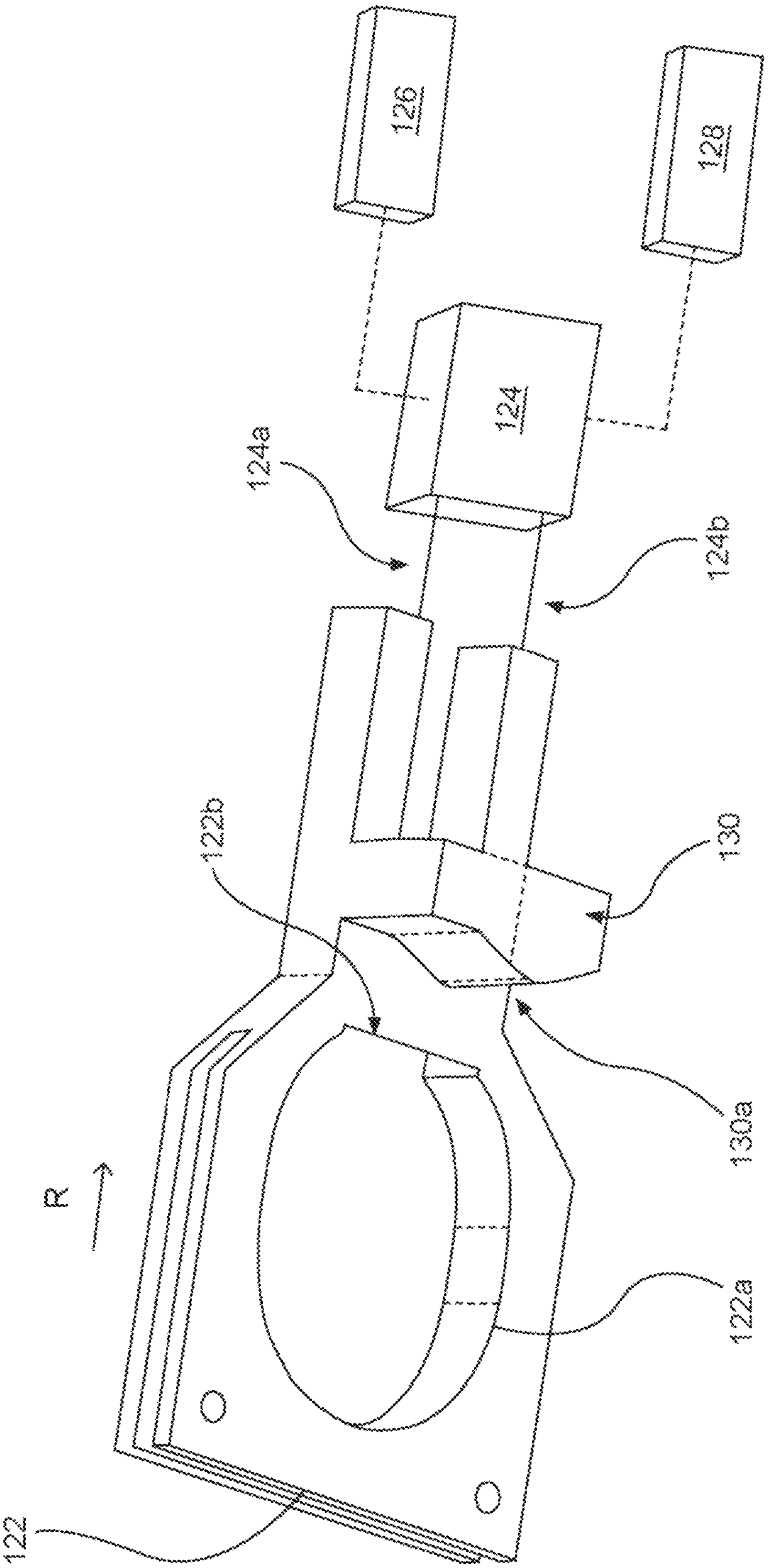
Figure 8:
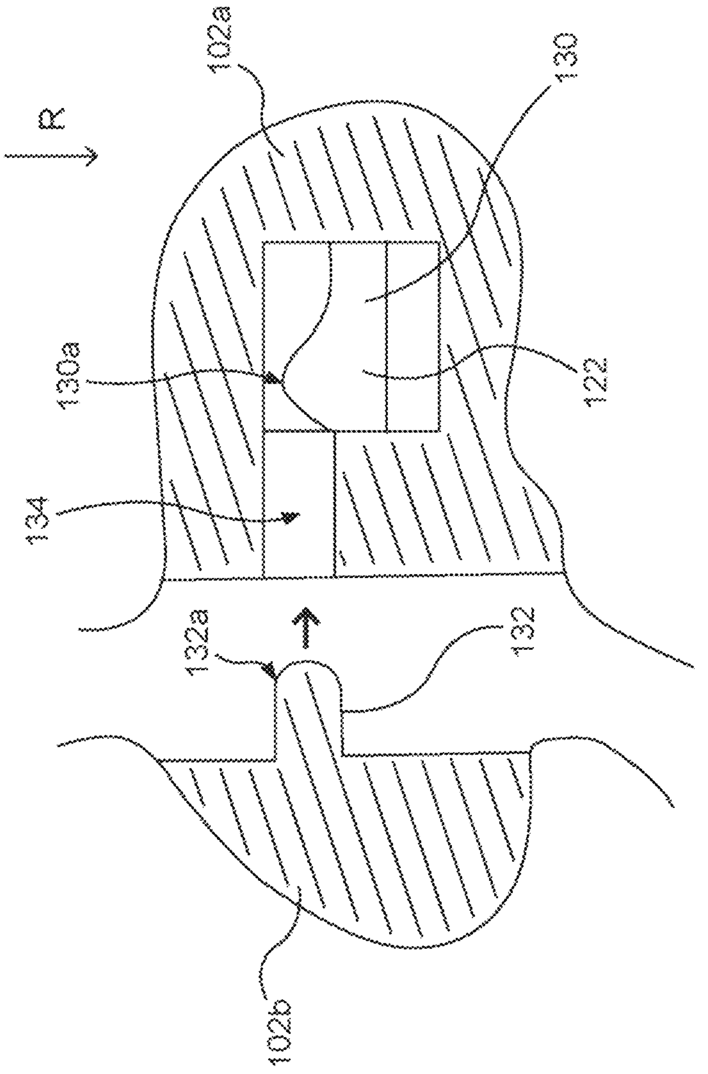

FIGS. 6*a*-6*c* each are perspective views of an embodiment of an actuating element and a blocking element of the bottle lock according to the invention, FIG. 7 shows an embodiment of a release element and an actuator coupled thereto, which are assigned to a locking mechanism of the bottle lock according to the invention; and FIG. 8 is a schematic partial view of a first and a second housing part of the bottle lock.

Figure 1:
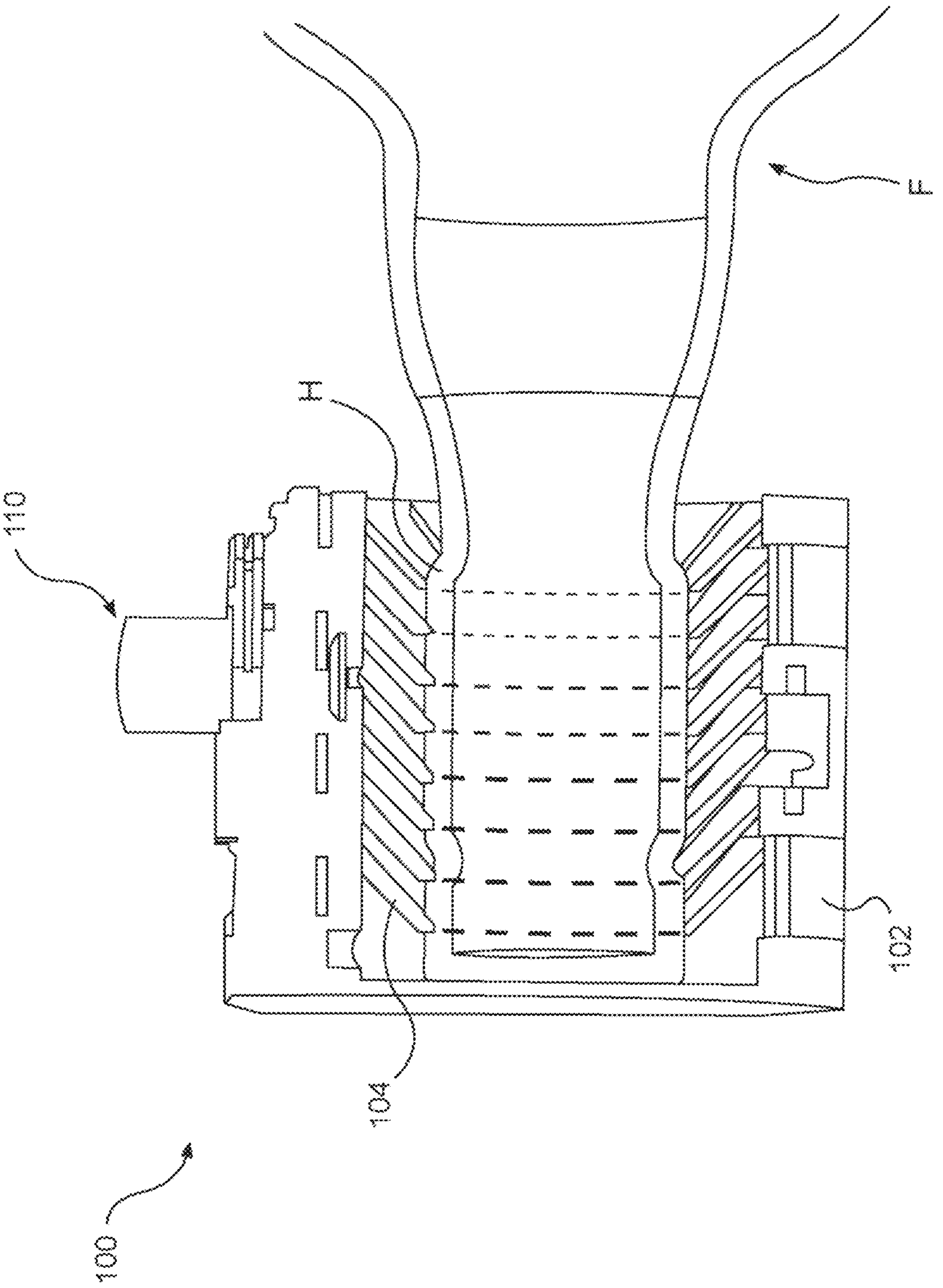
FIG. 1 is a sectional view of a bottle lock according to the invention, which is attached to an upper portion of a bottle neck of a bottle to be secured.

In FIG. 1, a bottle lock according to the invention is generally designated by 100. The bottle lock according to the invention comprises a housing part 102 which is designed to enclose an upper portion of a bottle neck H of a bottle F to be secured.

In order to be able to non-releasably engage with the upper portion of the bottle neck H, the bottle lock 100 further comprises a plurality of claws 104 which, in the embodiment shown, are designed in the form of a plurality of barbs.

Figure 2:
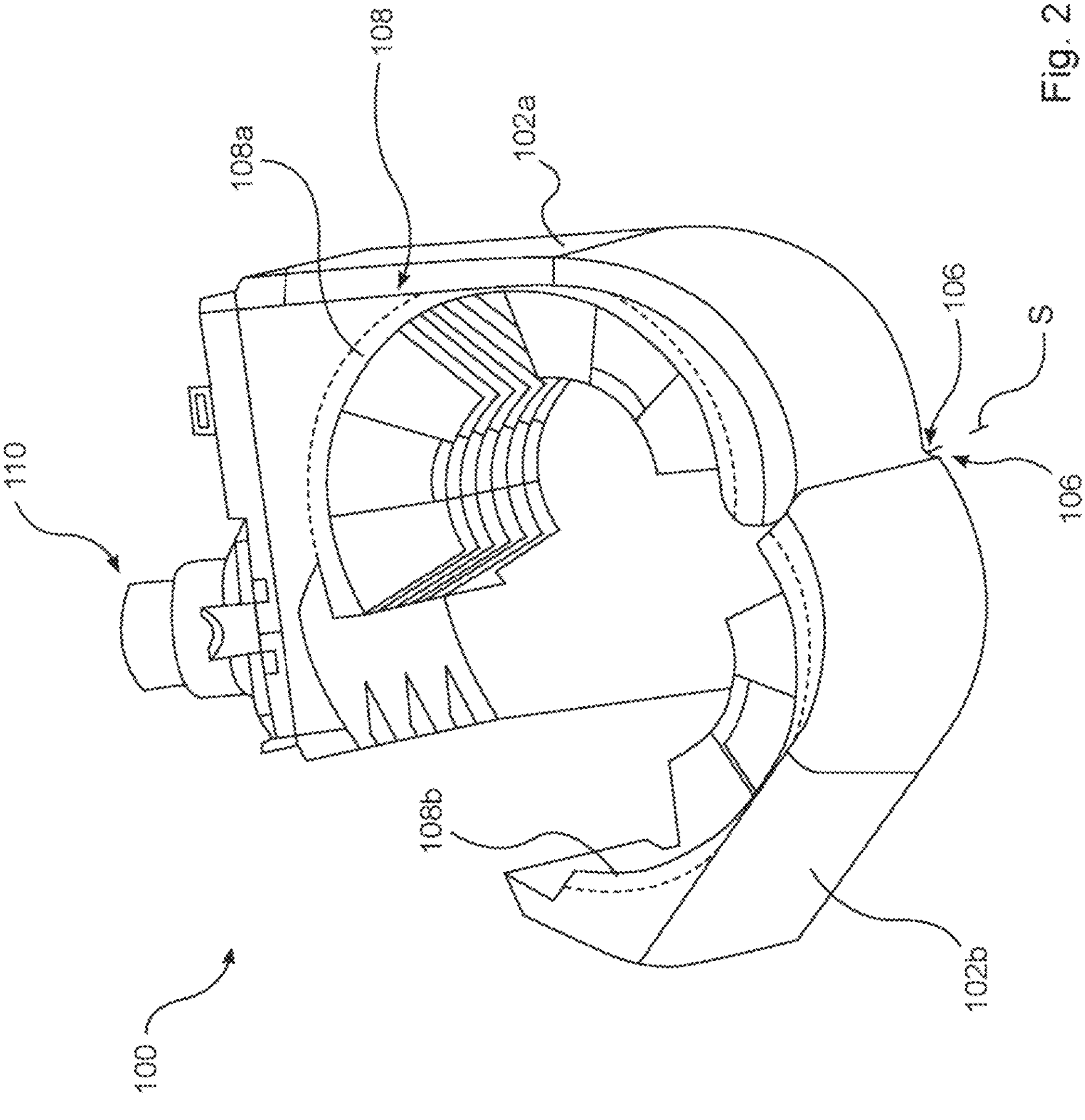
FIG. 2 is a perspective view of a bottle lock according to the invention, which is designed with a two-part housing and is in a released state.

In contrast, FIG. 2 shows the anti-theft device 100 according to the invention from FIG. 1 after it has been removed from the bottle neck H of the bottle F to be secured. FIG. 2 shows the bottle lock 100 according to the invention in a released state, i.e. an open state, in which the bottle lock 100 can be removed from the bottle F to be secured. In the illustrated embodiment, the housing 102 of the bottle lock 100 is designed as a two-part housing which comprises a first housing part 102*a* and a second housing part 102*b*. To transfer the bottle lock 100 from the secured state, i.e. a closed state, to the released state shown in FIG. 2, the first housing part 102*a* and the second housing part 102*b* are connected to each other by a hinge 106 so that they can pivot about a pivot axis S. The first housing part 102*a* and the second housing part 102*b* can be preloaded to the released state, i.e. the open position shown in FIG. 2, by a spring housed in one of the two housing parts, which acts along the pivot axis S.

In order to also be able to ensure that the bottle lock 100 can be held securely in the secured state, it further comprises a locking mechanism 110 which, in the embodiment shown, is assigned to the housing part 102*a* or is arranged thereon. The locking mechanism 110 is designed and intended to assume a locked state in which the relative pivoting movement of the two housing parts 102*a* and 102*b* from the secured state into the released state is prevented, and to assume an unlocked state in which the pivoting movement of the two housing parts 102*a* and 102*b* from the secured state into the released state is allowed.

The locking mechanism 110 will be described in more detail below.

Figure 3:
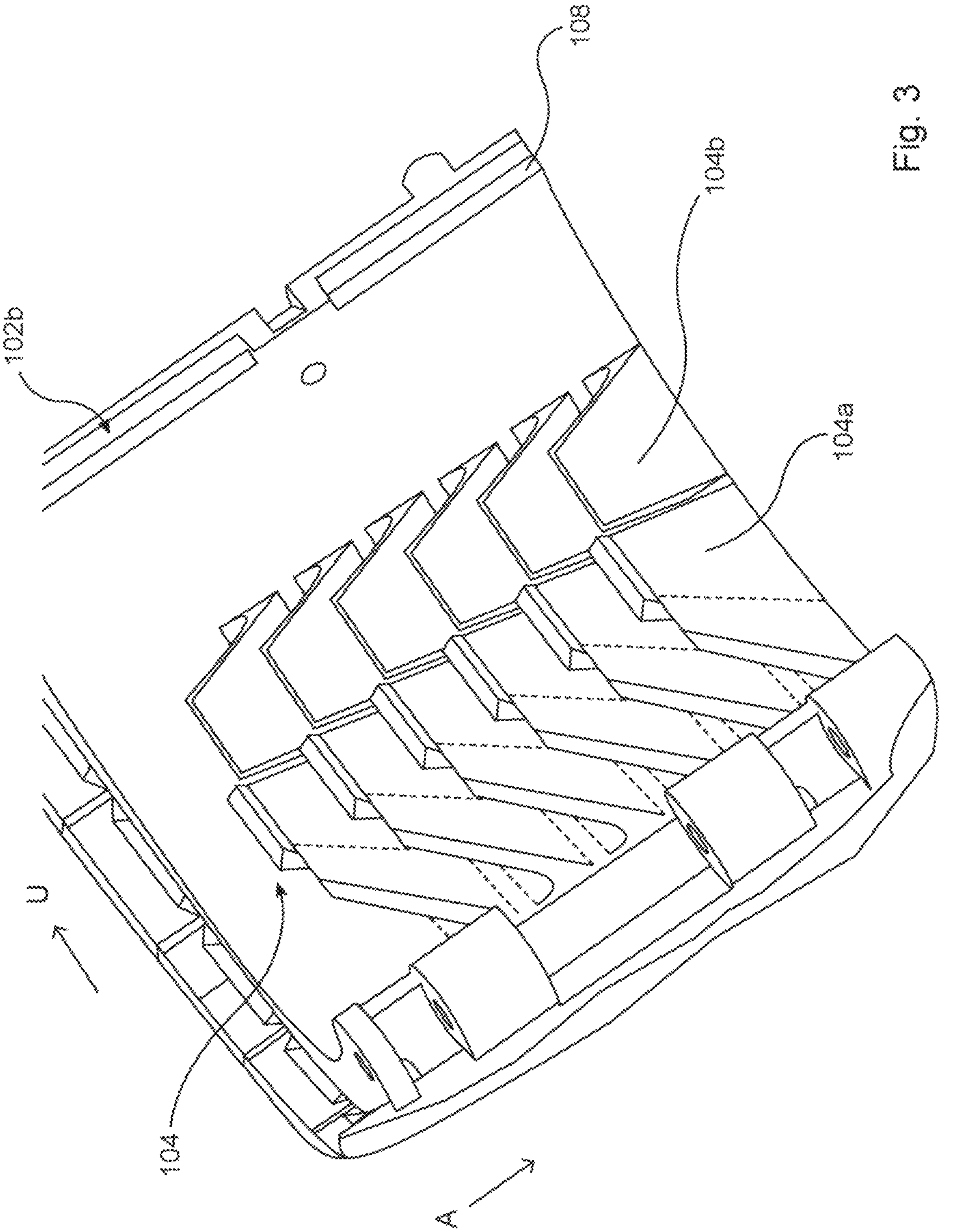
FIG. 3 is a perspective view of a housing part which is provided with a first and a second claw arrangement.

FIG. 3 now shows a perspective view of the housing part 102*b* of the bottle lock 100 from FIG. 2. As can be seen in FIG. 3, the housing part 102*b* comprises a plurality of claws 104 arranged thereon, which are subdivided into a first claw arrangement 104*a* and a second claw arrangement 104*b*. The claws of the first claw arrangement 104*a* differ in terms of their design from the claws of the second claw arrangement 104*b*. This has the advantage that the anti-theft device 100 according to the invention can be used both to secure a bottle type which corresponds to the claws of the first claw arrangement 104*a* and for a bottle type which corresponds to the claws of the second claw arrangement 104*b*. In addition, both the first claw arrangement 104*a* and the second claw arrangement 104*b* are each formed from a plurality of claws 104 arranged in a row along an attachment direction A of the bottle lock 100.

In order to be able to ensure an adequate distribution of force in a circumferential direction U of the housing part 102*b*, the first claw arrangement 104*a* and the second claw arrangement 104*b* are arranged adjacent to one another in the circumferential direction in an alternating manner. It should also be pointed out here that the housing 102 can also comprise further claws or claw arrangements, which substantially correspond to the claw arrangements 104*a* or 104*b*, which are not shown here for the sake of simplicity.

Furthermore, the claws 104 can be attached to the housing 102 in a displaceable or pivotable manner and can be biased in the direction of the bottle neck H by a further spring, for example a spiral spring.

The bottle lock 100 further comprises an insert portion 108, which in the illustrated embodiment is formed by an insert sub-portion 108*a* assigned to the first housing part 102*a* and an insert sub-portion 108*b* assigned to the second housing part 102*b* (see, for example, FIG. 2). In the illustrated embodiment, the claws 104 are attached to the insert portions 108*a* and 108*b*. Preferably, the insert portions 108*a* and 108*b* can be removed from and reinserted in the housing 102, i.e. the housing part 102*a* and 102*b*, so that the bottle lock 100 can be provided with different claw arrangements if desired, or a defective claw arrangement can be replaced in the event of wear. The insert portions 108*a* and 108*b* are shown in FIG. 2 only with dashed lines for the sake of simplicity.

With reference to FIGS. 4 to 8, the locking mechanism 110 of the bottle lock 100 according to the invention will now be described in more detail.

Figure 4:
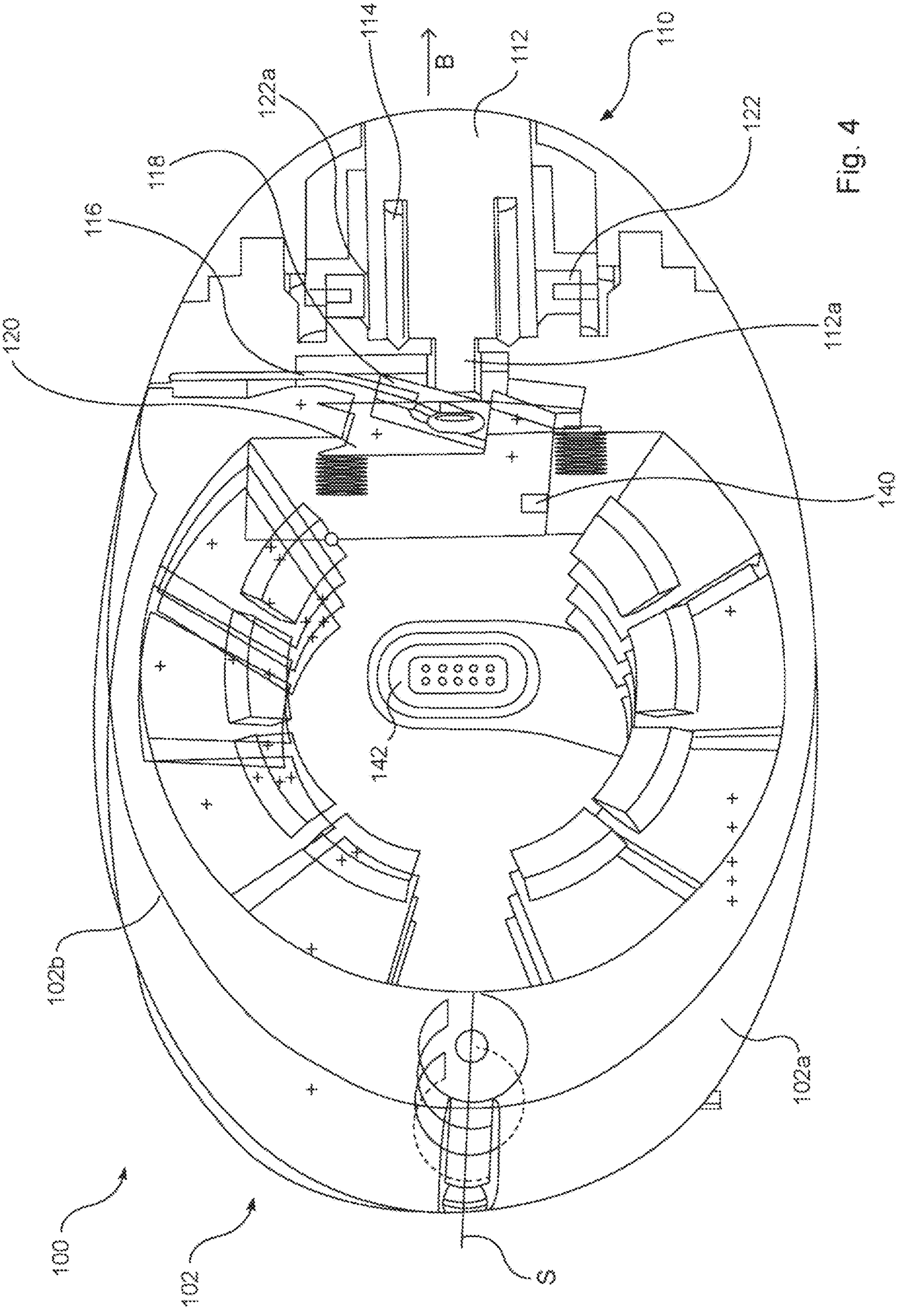
FIG. 4 is a perspective sectional view of a bottle lock according to the invention, which is in a secured state.

With reference to FIG. 4, which shows the locking mechanism 110 in the secured state, the locking mechanism 110 comprises an actuating element 112 which, in the embodiment shown, is designed as an actuating button mounted by means of a spring 114.

A free end 112*a* of the actuating element 112 is operatively connected to a blocking element 116 which, in the embodiment shown, is designed as an elongated strip made of sheet metal. A front end of the blocking element 116 is sheathed with a cap 118 made of plastics material.

In FIG. 4, the actuating element 112 is shown in its secured position, which causes the blocking element 116 to interact with a recess 120 formed in the housing part 102*b* in order to fix the two housing parts 102*a* and 102*b* in their relative orientation about the pivot axis S.

Figure 5:
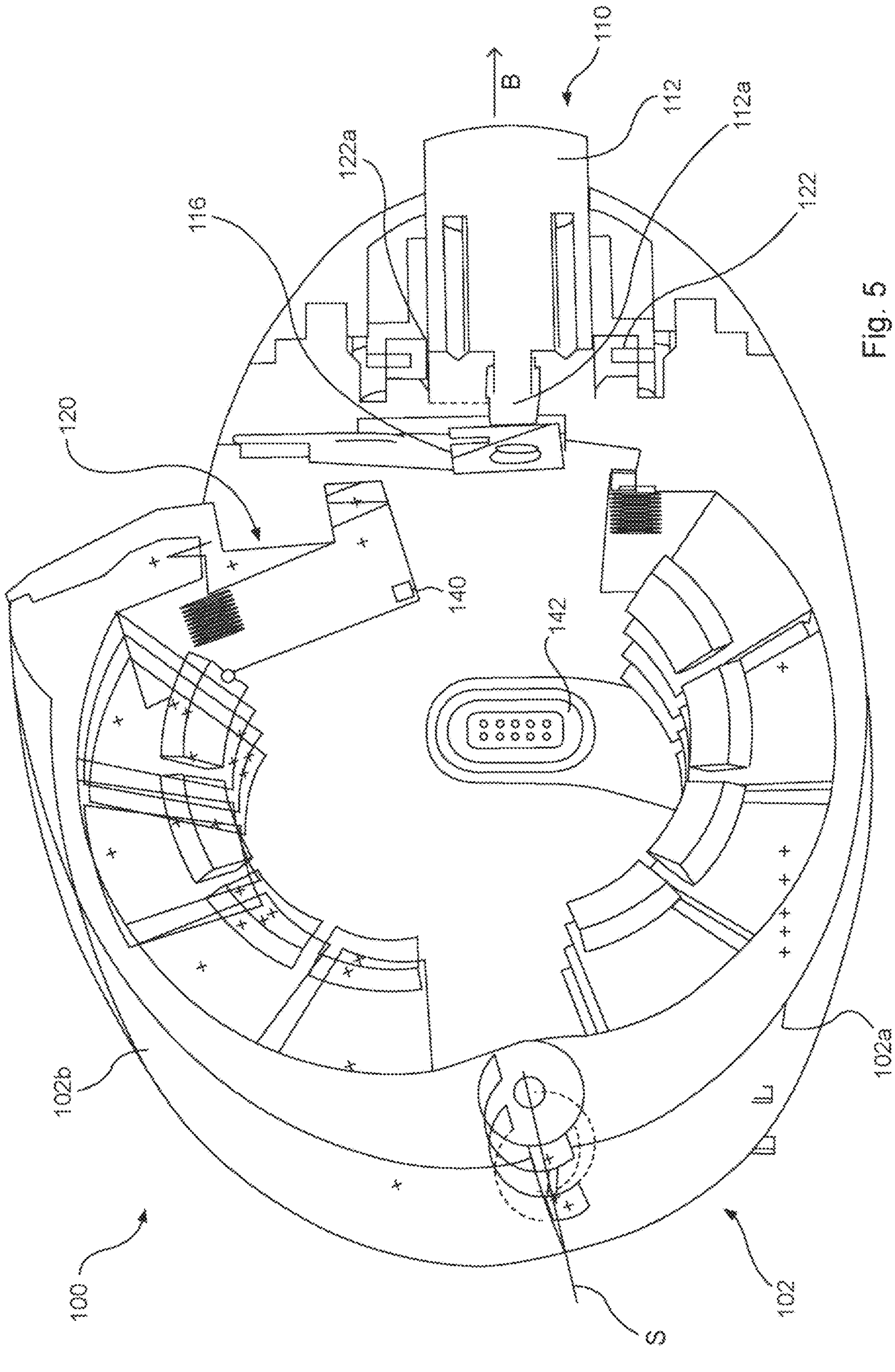
FIG. 5 shows the bottle lock according to the invention from FIG. 4, which has been transferred to the released state.

FIG. 5 shows the bottle lock 100 from FIG. 4, which has been transferred to the released state. For this purpose, the actuating element 112 is moved out of the housing part 102*a* along an actuating direction B, so that the blocking element 116, which is operatively connected to the end 112*a*, is brought out of engagement with the recess of the housing part 102*b*. As a result of this, the housing part 102*b* can be pivoted about the pivot axis S, preferably supported by a spring, and the bottle lock can be transferred to the released state.

In order to be able to control the movement of the actuating element 112 from its secured position into its released position, a release element in the form of a slide 122 is also provided, which has an opening 122*a* through which the actuating element 112 is guided substantially transversely to its direction of movement B. If the locking mechanism 110 of the bottle lock 100 is in the locked state (see FIG. 4), the slide 122 engages with the actuating element 112 in such a way that said actuating element cannot be displaced along its direction of movement B and is consequently held in its locked position.

If the bottle lock is to be transferred from the secured state shown in FIG. 4 to the released state shown in FIG. 5, the slide 122 is displaced substantially orthogonally to the direction of movement B or orthogonally to the plane of the drawing, as a result of which the effective blocking on the actuating element 112 by the slide 122 is cancelled and the actuating element 112 can move along its direction of movement B into the released position shown in FIG. 5.

The actuation of the slide 120 will be explained again in more detail with reference to FIG. 7.

FIGS. 6*a*, 6*b* and 6*c* again show several perspective views of the blocking element 116, which in the embodiment shown is formed as an elongated strip made of sheet metal, and of the actuating element 112.

As can be seen in FIG. 6*a-c*, the blocking element 116 has a fork shape into which the end 112*a* of the actuating element 112, which is nail-shaped in the illustrated embodiment, is inserted in a rotatable manner.

In order to be able to ensure that the operative connection between the actuating element 112 and the blocking element 116 has sufficient wear resistance, the plastics sheathing 118 already briefly mentioned above is also provided on the fork-shaped end of the blocking element 116. At this point, however, it should be pointed out that, if desired, the entire blocking element 116 can also be formed from plastics material.

The actuation of the slide 122 already explained in FIGS. 4 and 5 will now be described with reference to FIG. 7. FIG. 7 shows the slide 122 with the previously described opening 122*a*, through which the actuating element 112 is guided transversely to its direction of movement B. In order to be able to hold the actuating element 112 in its secured position, the slide 122 further comprises an engagement portion 122*b* which engages with an engagement groove (not shown) formed on the slide 122. In order to allow the movement of the actuating element 112, preferably supported by the spring 114, into the released position, the slide 122 is also connected to an actuator 124, which is also received in the housing part 102*a*, but for the sake of simplicity in the drawing is shown only as a black box. The actuator 124 comprises two shape memory wires 124*a* and 124*b*, which are connected at one end to the actuator 124 and at the other end to a free end of the slide 122. If the wires 124*a* and 124*b* are heated by the actuator 124, they contract, which leads to a displacement of the slide 122 in the direction R. As a result of this, the engagement between the engagement portion 122*b* and the groove of the actuating element 112 is cancelled, whereby the actuating element 112 can be transferred to its released position.

In order to provide the energy required for this, the actuator 124 is operatively connected to an energy supply unit 126, which can be designed as a battery, for example. Furthermore, the actuator 124 can be operationally connected to a signal receiving unit 128, so that the actuator 124 preferably only actuates the slide 122 when a corresponding release initiation signal has previously been received by the signal receiving unit 128.

In the event that the bottle lock 100 is in the released state (see FIG. 5), but the locking mechanism has already assumed its locked state (see FIG. 4), it may be that the bottle lock 100 cannot be transferred to the secured state without the actuator 124 first actuating the slide 122 and the actuating element 112 being transferred to its released position. In order to prevent a release initiation signal always first having to be sent to the bottle lock 100 in such a situation, the slide further comprises a projection 130 having an active surface 130*a* which has a curved shape.

FIG. 8 shows a schematic sectional view of the slide 122 when it is received in the housing part 102*a*. In order to be able to displace the slide 122 along the direction R without the action of the actuator 124, a further projection 132 having a further active surface 132*a* can be provided on a free end of the housing part 102*b*, which, as soon as the bottle lock 100 is transferred from the released state, i.e. the open state, to the secured state, i.e. the closed state, first runs through a guide 134 formed in the housing part 102*a* and then interacts with the active surface 130*a* of the projection 130 of the slide 122, so that the slide 122 is displaced along the direction R, the actuating element 112 is transferred along the direction B from the secured position to the released position, and therefore the bottle lock 100 can be brought into the state shown in FIG. 4, without an actuation of the actuator 124 being required here.

It should also be added that the bottle lock 100 can further comprise a first sensor unit 140, which is set up to detect whether the bottle lock 100 is in the secured state, i.e. the state shown in FIG. 4, or in the released state, i.e. in the state shown in FIG. 5. The sensor unit 140 can for example be designed as a pushbutton switch or the like.

In order to also be able to check whether the bottle lock 100 is attached to a bottle F to be secured or not, the bottle lock 100 can further comprise a second sensor unit 142, which can also be designed as a pushbutton switch, a light barrier or the like.

In order to be able to prevent the bottle lock 110 from being removed from a secured area, it can finally include an anti-theft element which is set up to interact with an external anti-theft system so that an alarm signal can be emitted if the bottle lock is removed from the secured area without authorisation.

The invention claimed is:

1. A bottle lock for a bottle, the bottle lock comprising:

a first and a second housing part which are designed to non-releasably enclose an upper portion of a bottle neck of the bottle to be secured, in a secured state, wherein the first and the second housing part are connected to one another such that they can move relative to one another and can be transferred between the secured state and a released state in which the bottle lock can be released from the bottle neck; and a locking mechanism which is assigned to one of the first and the second housing part and is set up to lock the first and the second housing part in the secured state, wherein the locking mechanism comprises:

an actuating element which can be displaced between a released position and a secured position;

a blocking element which is operatively connected to the actuating element and which, in the secured position of the actuating element, engages with the other of the first and the second housing part in order to fix the two housing parts in their relative orientation; and a release element which is assigned to the actuating element and is set up to block a movement of the actuating element from the secured position into the released position in the locked state of the locking mechanism, and to allow a movement of the actuating element from the secured position into the released position in an unlocked state of the locking mechanism, wherein the release element can be substantially displaced orthogonally to a direction of movement of the actuating element in order to selectively block or release the movement of the actuating element, wherein the blocking element is arranged substantially transversely to the actuating element, and wherein the locking mechanism further comprises an actuator which is operatively coupled to the release element, wherein the actuator is at least partially formed by a shape memory alloy.

2. The bottle lock according to claim 1, further comprising:

a housing part which comprises the first and second housing part;

a plurality of claws arranged in the housing part, which are designed and intended to engage non-releasably with an upper portion of the bottle neck when the bottle lock is in a secured state and to allow the bottle lock to be released and removed away from the upper portion of the bottle neck in the released state of the bottle lock; and the locking mechanism which is designed and intended to assume the unlocked state in which the bottle lock can be transferred from the secured state to the released state, and to assume the locked state in which the bottle lock cannot be transferred from the secured state to the released state, wherein the plurality of claws is subdivided at least into a first and a second claw arrangement, wherein each claw arrangement is assigned a part of the plurality of claws, wherein the first claw arrangement differs from the second claw arrangement with regard to at least one claw design feature.

3. The bottle lock according to claim 2, wherein the at least one claw design feature corresponds to a length and/or a width and/or an angle and/or a shape of the claws.

4. The bottle lock according to claim 2, wherein the first claw arrangement and/or the second claw arrangement is each formed from a plurality of claws arranged in a row.

5. The bottle lock according to claim 2, wherein the first claw arrangement and the second claw arrangement are arranged adjacent to one another.

6. The bottle lock according to claim 2, wherein at least some of the plurality of claws are attached in a displaceable or pivotable manner to the housing or a part connected to thereto, and is biased in the direction of the bottle neck by a resilient element.

7. The bottle lock according to claim 2, wherein the first housing part and the second housing part are connected to one another so as to be movable relative to one another and can be transferred between the secured state in which the plurality of claws of the bottle lock engages non-releasably with the upper portion of the bottle neck, and the released state, in which a detachment of the bottle lock from the bottle neck is made possible.

8. The bottle lock according to claim 7, wherein the first and the second housing part are connected to one another by a hinge in a pivotable manner relative to one another, wherein a pivot axis of the hinge is arranged in the secured state above the bottle neck or is parallel thereto.

9. The bottle lock according to claim 7, wherein the first and the second housing part are preloaded to their released state by a second resilient element.

10. The bottle lock for a bottle according to claim 2, wherein the bottle lock comprises an insert portion which is designed and intended to be inserted into the housing part of the bottle lock, wherein the plurality of claws is attached to or encompassed by the insert portion.

11. The bottle lock according to claim 10, wherein the insert portion is also designed and intended to be releasably inserted into the housing part.

12. The bottle lock according to claim 1, wherein the blocking element is designed as an elongated strip made of sheet metal.

13. The bottle lock according to claim 1, wherein the other of the first and the second housing part comprises a recess which is designed and intended to interact with the blocking element.

14. The bottle lock according to claim 1, wherein the actuating element is movably connected to the blocking element, wherein one end of the actuating element is designed as a pin and/or is nail-shaped and/or the blocking element is fork-shaped.

15. The bottle lock according to claim 1, wherein the release element is designed as a slide, which has an opening through which the actuating element is guided.

16. The bottle lock according to claim 1, wherein the release element has a projection which is designed and intended to interact with a further projection formed on the other of the first and the second housing part when the bottle lock is transferred to the secured state, in such a way that the release element releases the movement of the actuating element in the direction of its released position.

17. The bottle lock according to claim 1, wherein the actuating element is preloaded to its released position by a third resilient element.

18. The bottle lock according to claim 1, further comprising:

a housing part which comprises the first and the second housing part is designed to enclose an upper portion of the bottle neck of the bottle to be secured;

a plurality of claws arranged in the housing part, which are designed and intended to engage non-releasably with the upper portion of the bottle neck when the bottle lock is in a secured state, and to allow the bottle lock to be released and removed away from the upper portion of the bottle neck in the released state of the bottle lock; and a locking mechanism which is designed and intended to assume an unlocked state in which the bottle lock can be transferred from the secured state to the released state, and to assume a locked state in which the bottle lock cannot be transferred from the secured state to the released state, wherein the bottle lock further comprises a first sensor unit, which is set up to detect whether the bottle lock is in the secured state or in the released state, and a second sensor unit which is set up to detect whether the upper portion of the bottle neck of the bottle to be secured is enclosed or not.

19. The bottle lock according to claim 18, wherein the first sensor unit and/or the second sensor unit comprises a light barrier and/or an ultrasonic sensor and/or a magnetic sensor and/or a pushbutton switch and/or a Hall sensor.

20. A method for operating a bottle lock according to claim 18, the method comprising:

a) putting the bottle lock into an idle mode;

b) detecting whether the bottle lock is transferred from a released state to a secured state;

c) as soon as the bottle lock has been transferred from the released state to the secured state, switching the bottle lock into an active mode;

d) detecting whether the bottle lock is attached to an upper portion of a bottle neck of a bottle to be secured;

e) as soon as the bottle lock has been attached to the upper portion of the bottle neck of the bottle to be secured, switching the bottle lock into an alarm mode;

f) monitoring whether the bottle lock is removed from the upper portion of the bottle to be secured, and if this is the case, emitting an alarm signal; and g) receiving an opening signal and transferring the bottle lock from the secured state to the released state, so that the bottle lock can be removed from the upper portion of the bottle neck of the bottle to be secured and returning to step a).

* * * * *